(12) United States Patent
Kim

(10) Patent No.: US 12,150,044 B2
(45) Date of Patent: Nov. 19, 2024

(54) SCHEME FOR SELECTING SMF NODE

(71) Applicant: LG Electronics Inc., Seoul (KR)

(72) Inventor: Hyunsook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 118 days.

(21) Appl. No.: 17/624,785

(22) PCT Filed: Oct. 6, 2020

(86) PCT No.: PCT/KR2020/013547
§ 371 (c)(1),
(2) Date: Jan. 4, 2022

(87) PCT Pub. No.: WO2021/177528
PCT Pub. Date: Sep. 10, 2021

(65) Prior Publication Data
US 2022/0400430 A1    Dec. 15, 2022

(30) Foreign Application Priority Data

Mar. 2, 2020  (KR) .......................... 10-2020-0026173

(51) Int. Cl.
*H04W 48/18*  (2009.01)
*H04W 76/19*  (2018.01)
(Continued)

(52) U.S. Cl.
CPC ........... *H04W 48/18* (2013.01); *H04W 76/19* (2018.02); *H04W 76/30* (2018.02); *H04W 92/24* (2013.01)

(58) Field of Classification Search
CPC ..... H04W 48/18; H04W 76/19; H04W 76/30; H04W 92/24; H04W 36/0011;
(Continued)

(56) References Cited

U.S. PATENT DOCUMENTS

2020/0145876 A1* 5/2020 Dao ..................... H04L 12/1407
2021/0037585 A1* 2/2021 Youn ...................... H04W 76/30
(Continued)

FOREIGN PATENT DOCUMENTS

KR     20190043095     4/2019
KR     20190056914     5/2019
(Continued)

OTHER PUBLICATIONS

3GPP, "3rd Generation Partnership Project; Technical Specification Group Services and System Aspects; Procedures for the 5G System (5GS); Stage 2 (Release 16)," TS 23.502, v16.3.0, Dec. 2019, 555 pages.
(Continued)

*Primary Examiner* — Ivan O Latorre
(74) *Attorney, Agent, or Firm* — Fish & Richardson P.C.

(57) ABSTRACT

A disclosure of the present specification provides a method for operating an access and mobility management function (AMF) node for selecting a session management function (SMF) node. The method may comprise the steps of receiving a first message including application function (AF) request information from an AF node; selecting or reselecting an SMF on the basis of the AF request information; and transmitting a second message including the AF request information to the selected or reselected SMF.

11 Claims, 20 Drawing Sheets

(51) Int. Cl.
*H04W 76/30* (2018.01)
*H04W 92/24* (2009.01)

(58) Field of Classification Search
CPC ..... H04W 36/12; H04W 76/11; H04W 76/22; H04W 76/27; H04W 80/10; H04W 88/18; H04L 41/34; H04L 41/5003
See application file for complete search history.

(56) References Cited

U.S. PATENT DOCUMENTS

| | | | | |
|---|---|---|---|---|
| 2021/0352537 | A1* | 11/2021 | Bharatia | H04W 36/0072 |
| 2021/0392561 | A1* | 12/2021 | Liang | H04W 8/22 |
| 2022/0030069 | A1* | 1/2022 | Yao | H04W 76/22 |
| 2022/0150683 | A1* | 5/2022 | Zhou | H04W 60/04 |
| 2022/0304104 | A1* | 9/2022 | Mihály | H04W 76/19 |
| 2022/0400430 | A1* | 12/2022 | Kim | H04W 36/12 |
| 2023/0080830 | A1* | 3/2023 | Fernandez Alonso | H04M 15/8038 455/422.1 |
| 2023/0088955 | A1 | 3/2023 | Kim | |
| 2023/0090022 | A1* | 3/2023 | Han | H04L 41/5058 370/329 |

FOREIGN PATENT DOCUMENTS

| | | | |
|---|---|---|---|
| KR | 20190095933 | 8/2019 | |
| WO | WO-2019154295 A1 * | 8/2019 | H04L 41/5003 |

OTHER PUBLICATIONS

3GPP, "3rd Generation Partnership Project; Technical Specification Group Core Network and Terminals; 5G System; Session Management Policy Control Service; Stage 3 (Release 16)," TS 29.512 V16.3.0, Dec. 2019, 180 pages.

Catt, "Solution for KI #5: Activating the traffic routing towards Local Data Network per AF request," SA WG2 Meeting #S2-136 Ad-hoc, S2-2000689, Jan. 13-17, 2020, Incheon, Korea, 4 pages.

Extended European Search Report in European Appln. No. 20923382. 4, mailed on Feb. 29, 2024, 11 pages.

Zte, "Solution to KI#1: Discovery of Edge Application Server," 3GPP TSG-SA/WG2 Meeting # 136-AH, S2-2001715, Jan. 13-17, 2020, Incheon, Korea, 5 pages.

* cited by examiner

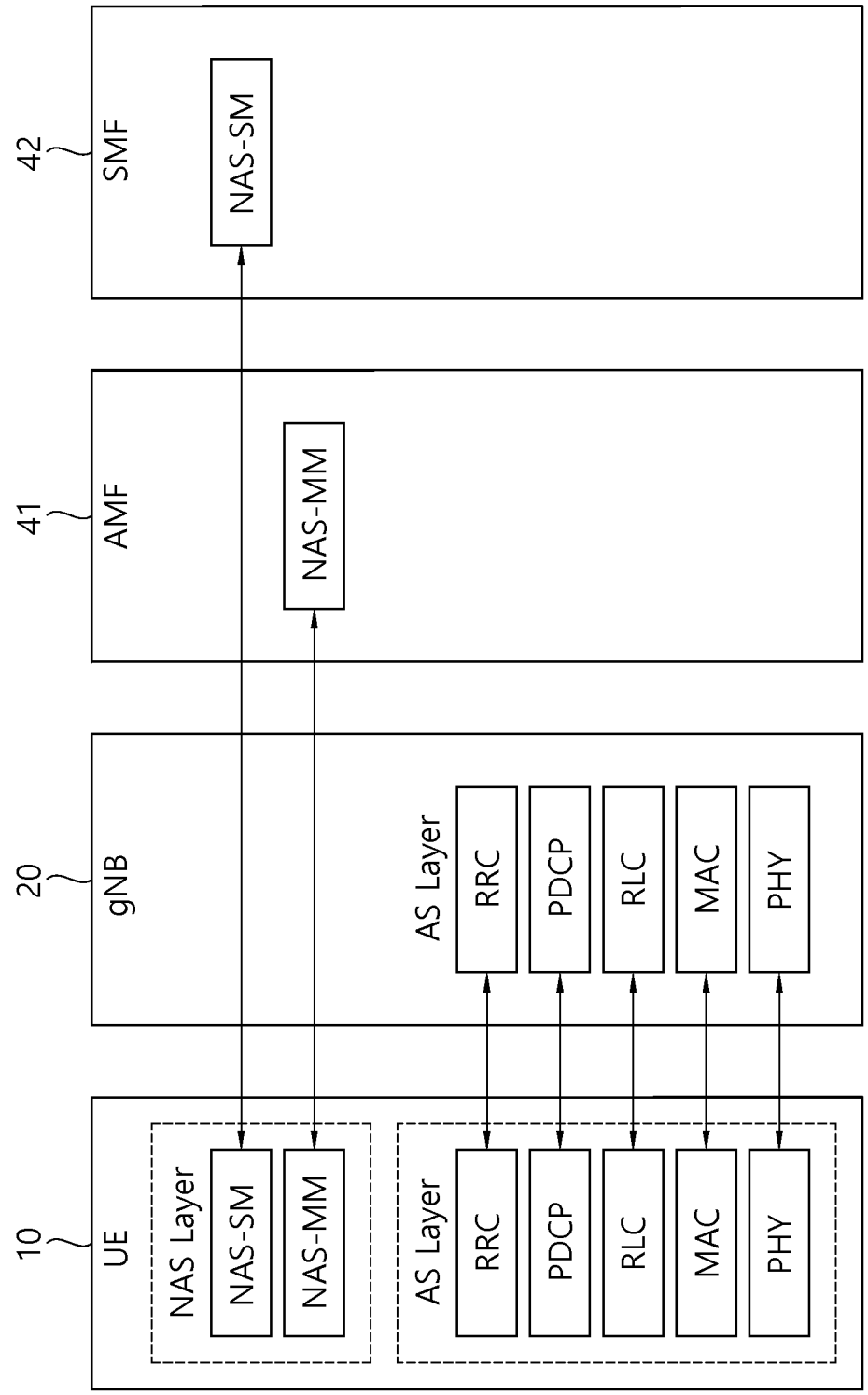

SCHEME FOR SELECTING SMF NODE

CROSS-REFERENCE TO RELATED APPLICATIONS

This application is a National Stage application under 35 U.S.C. § 371 of International Application No. PCT/KR2020/013547, filed on Oct. 6, 2020, which claims the benefit of Korean Patent Application No. 10-2020-0026173, filed on Mar. 2, 2020. The disclosures of the prior applications are incorporated by reference in their entirety.

TECHNICAL FIELD

The present specification relates to mobile communications.

BACKGROUND

FIG. 1 is a structural diagram of an evolved mobile communication network.

The Evolved Packet Core (EPC) may include various components, and in FIG. 1, some of them, a Serving Gateway (S-GW) 52, a Packet Data Network Gateway (PDN GW) 53, Mobility Management Entity (MME) 51, Serving General Packet Radio Service (GPRS) Supporting Node (SGSN), enhanced Packet Data Gateway (ePDN) are shown.

The S-GW 52 is an element that functions as a boundary point between the Radio Access Network (RAN) and the core network, and maintains a data path between the eNodeB 22 and the PDN GW 53. In addition, when a terminal (or User Equipment: UE) moves over an area served by the eNodeB 22, the S-GW 52 serves as a local mobility anchor point. That is, packets may be routed through the S-GW 52 for mobility within the E-UTRAN (Evolved Universal Mobile Telecommunications System (UTMS) Terrestrial Radio Access Network defined after 3GPP Release-8). In addition, the S-GW 52 may serve as an anchor point for mobility with other 3GPP networks (RAN defined before 3GPP Release-8, e.g., UTRAN or Global System for Mobile Communication (GSM)/Enhanced Data rates for Global Evolution (EDGE) Radio Access Network (GERAN)).

The PDN GW (or P-GW) 53 corresponds to the termination point of the data interface towards the packet data network. The PDN GW 53 may support policy enforcement features, packet filtering, charging support, and the like. In addition, the PDN GW 53 may serve as an anchor point for mobility management between the 3GPP network and the non-3GPP network (e.g., untrusted networks such as Interworking Wireless local area networks (I-WLANs), trusted networks such as Code Division Multiple Access (CDMA) networks).

In the example of the network structure of FIG. 1, the S-GW 52 and the PDN GW 53 are configured as separate gateways, but the two gateways may be implemented according to a single gateway configuration option.

The MME 51 is an element that performs signaling and control functions to support access to a network connection of the UE, allocation of network resources, tracking, paging, roaming and handover, etc. The MME 51 controls control plane functions related to subscriber and session management. The MME 51 manages a number of eNodeBs 22 and performs signaling for selection of a conventional gateway for handover to another 2G/3G network. In addition, the MME 51 performs functions such as security procedures, terminal-to-network session handling, and idle terminal location management.

The SGSN handles all packet data such as user's mobility management and authentication to other access3GPP networks (e.g., GPRS networks, UTRAN/GERAN).

The ePDG acts as a security node for untrusted non-3GPP networks (e.g., I-WLAN, Wi-Fi hotspots, etc.).

As described with reference to FIG. 1, the terminal (or UE) having IP capability may access an IP service network (e.g., IMS) provided by the operator via various elements in the EPC based on 3GPP access as well as non-3GPP access.

In addition, FIG. 1 shows various reference points (e.g., S1-U, S1-MME, etc). In the 3GPP system, a conceptual link connecting two functions existing in different functional entities of E-UTRAN and EPC is defined as a reference point. Table 1 below summarizes the reference points shown in FIG. 1. In addition to the examples in Table 1, various reference points may exist according to the network structure.

TABLE 1

| Reference points | Description |
| --- | --- |
| S1-MME | Reference point for control plane protocol between E-UTRAN and MME |
| S1-U | Reference point between E-UTRAN and SGW for inter-eNB path switching and per-bearer user plane tunneling during handover |
| S3 | Reference point between MME and SGSN providing user and bearer information exchange for mobility between 3GPP access networks in idle and/or active state. This reference point may be used for intra-Public Land Mobile Network (PLMN) or inter-PLMN (e.g., in case of inter-PLMN handover). |
| S4 | Reference point between the SGW and SGSN providing related control and mobility support between the GPRS core and the 3GPP anchor function of the SGW. In addition, if a direct tunnel is not established, user plane tunneling is provided. |
| S5 | Reference point providing user plane tunneling and tunnel management between SGW and PDN GW. Used for SGW relocation when connection to a PDN GW not co-located with the SGW is required due to UE mobility and for the required PDN connectivity |
| S11 | Reference point between MME and SGW |
| SGi | Reference point between PDN GW and PDN. The PDN may be a public or private PDN external to the operator or an intra-operator PDN for e.g., provision of an IMS service. This reference point corresponds to Gi of 3GPP access. |

Among the reference points shown in FIG. 1, S2a and S2b correspond to non-3GPP interfaces. S2a is a reference point that provides related control and mobility support between trusted non-3GPP access and PDN GWs to the user plane. S2b is a reference point that provides related control and mobility support between ePDG and PDN GW to the user plane.

With the success of Long-Term Evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The fifth-generation mobile communication supports multiples numerologies (and/or multiple Subcarrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

NR frequency band is defined as a frequency range of two types, i.e., FR1, FR2. FR1 is 410 MHz-7125 MHz, and FR2 is 24250 MHz-52600 MHz, meaning millimeter wave (mmW).

For convenience of explanation, among the frequency ranges used in the NR system, FR1 may mean "sub 6 GHz range". FR2 may mean "above 6 GHz range", and may be referred to as millimeter Wave (mmW).

TABLE 2

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of above 6 GHz (or, 5850, 5900, 5925 MHz, etc.). For example, a frequency band of above 6 GHz (or, 5850, 5900, 5925 MHz, etc.) included in FR1 may include an unlicensed band. The unlicensed band may be used for various purposes, e.g., for communication for a vehicle (e.g., autonomous driving).

TABLE 3

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

The ITU suggests three usage scenarios, e.g., enhanced Mobile Broadband (eMBB), massive Machine Type Communication (mMTC), and Ultra-Reliable and Low Latency Communications (URLLC).

URLLC relates to a usage scenario in which high reliability and low delay time are required. For example, services like autonomous driving, automation, and virtual realities requires high reliability and low delay time (e.g., 1 ms or less). A delay time of the current 4G (LTE) is statistically 21-43 ms (best 10%), 33-75 ms (median). Thus, the current 4G (LTE) is not sufficient to support a service requiring a delay time of 1 ms or less.

Next, the eMBB relates to a usage scenario that requires a mobile ultra-wideband.

These ultra-wideband high-speed services seem to be difficult to accommodate by existing core networks designed for LTE/LTE-A.

Therefore, the redesign of core networks is urgently needed in so-called fifth-generation mobile communications.

FIG. 2 is a structural diagram of a next-generation mobile communication network.

The 5G Core network (5GC) may include various components, part of which are shown in FIG. 2, including an Access and mobility Management Function (AMF) 41, a Session Management Function (SMF) 42, a Policy Control Function (PCF) 43, a User Plane Function (UPF) 44, an Application Function (AF) 45, a Unified Data Management (UDM) 46 and a Non-3GPP Interworking Function (N3IWF) 49.

A UE 10 is connected to a data network via the UPF 44 through a Next Generation Radio Access Network (NG-RAN) (i.e., gNB or base station).

The UE 10 may be provided with a data service even through untrusted non-3GPP access, e.g., a Wireless Local Area Network (WLAN). In order to connect the non-3GPP access to a core network, the N3IWF 59 may be deployed.

FIG. 3 is an exemplary diagram illustrating a predicted structure of a next generation mobile communication in terms of a node.

Referring to FIG. 3, the UE is connected to a Data Network (DN) through a NG-RAN.

The Control Plane Function (CPF) node as shown may perform all or part of the Mobility Management Entity (MME) function of the fourth generation mobile communication, and all or a part of the control plane function of the Serving Gateway (S-GW) and the PDN-Gateway (P-GW) of the fourth generation mobile communication. The CPF node includes an Access and mobility Management Function (AMF) node and a Session Management Function (SMF).

The User Plane Function (UPF) node as shown is a type of a gateway over which user data is transmitted and received. The UPF node may perform all or part of the user plane functions of the S-GW and the P-GW of the fourth generation mobile communication.

The Policy Control Function (PCF) node as shown is configured to control a policy of the service provider.

The Application Function (AF) node as shown refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In FIG. 3, a UE can simultaneously access two data networks using multiple Protocol Data Unit (PDU) sessions.

FIG. 4 is an exemplary diagram illustrating an architecture for supporting simultaneously access two data networks.

FIG. 4 illustrates an architecture that allows the UE to simultaneously access two data networks using one PDU session.

Reference points shown in FIGS. 3 and 4 are as follows.

N1 is a reference point between UE and AMF.
N2 is a reference point between (R)AN and AMF.
N3 is a reference point between (R)AN and UPF.
N4 is a reference point between SMF and UPF.
N5 is a reference point between PCF and AF.
N6 is a reference point between UPF and DN.
N7 is a reference point between SMF and PCF.
N8 is a reference point between UDM and AMF.
N9 is a reference point between UPFs.
N10 is a reference point between UDM and SMF.
N11 is a reference point between AMF and SMF.
N12 is a reference point between AMF and AUSF.
N13 is a reference point between UDM and AUSF.
N14 is a reference point between AMFs.
N15 is a reference point between PCF and AMF.

N16 is a reference point between SMFs.

N22 is a reference point between AMF and NSSF.

FIG. 5 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the Open System Interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a Medium Access Control (MAC) layer, a Radio Link Control (RLC) layer, and a Packet Data Convergence Protocol (PDCP) layer.

The third layer includes Radio Resource Control (hereinafter abbreviated as RRC) layer. The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The Non-Access Stratum (NAS) layer performs functions such as connection management (session management) and mobility management.

The NAS layer is divided into a NAS entity for Mobility Management (MM) and a NAS entity for Session Management (SM).

1) NAS entity for MM provides the following functions in general.

NAS procedures related to AMF include the following.

Registration management and access management procedures. AMF supports the following functions.

Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,

The NAS entity for the MM creates a NAS-MM message that derives how and where to deliver an SM signaling message through a security header representing the NAS transmission of SM signaling and additional information on a received NAS-MM.

Upon receiving SM signaling, the NAS entity for the SM performs an integrity check of the NAS-MM message, analyzes additional information, and derives a method and place to derive the SM signaling message.

Meanwhile, in FIG. 5, the RRC layer, the RLC layer, the MAC layer, and the PHY layer located below the NAS layer are collectively referred to as an Access Stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs Registration Management (RM) and Connection Management (CM) for 3GPP access as well as non-3GPP access.

On the other hand, when the UE creates a PDU session in 3GPP access or non-3GPP access and then attempts to perform handover to another access, the handover may fail if resource reservation in the access network fails.

In this case, the SMF is supposed to notify the AMF that the PDU session has been released. In this case, AMF deletes all contexts for the corresponding PDU session. In this case, there is a problem in that the UE can no longer send and receive NAS signaling for the PDU session.

SUMMARY

Accordingly, an object of the present specification is to propose a method for solving the above-described problems.

In order to solve the above-described problems, a disclosure of the present specification provides a method of operating an Access and mobility Management Function (AMF) node for selecting a Session Management Function (SMF) node. The method may comprise receiving a first message including Application Function (AF) request information from an AF node; selecting or reselecting an SMF based on the AF request information; and transmitting a second message including the AF request information to the selected or reselected SMF.

The first message may be an N11 message.

The AF request information may include a requested Data Network Access Identifier (DNAI) and AF request level.

The SMF may be selected or reselected based on the requested DNAI.

The SMF may be selected or reselected based on the AF request level.

A transmission of the second message to the selected or reselected SMF may trigger a change of a User Plane (UP) path.

The change of the UP path may comprise: performing a deactivation or a release procedure of a Protocol Data Unit (PDU) session; and performing a re-activation or a re-establishment procedure of the PDU session.

In order to solve the above-described problems, a disclosure of the present specification provides a chipset mounted on an Access and Mobility Management Function (AMF) node that selects a Session Management Function (SMF) node. The chipset may comprise at least one processor; at least one memory for storing instructions and operably electrically connectable to the at least one processor. The instructions, based on being executed by the at least one processor, may perform operations comprising: receiving a first message including Application Function (AF) request information from an AF node; selecting or reselecting an SMF based on the AF request information; and transmitting a second message including the AF request information to the selected or reselected SMF.

In order to solve the above-described problems, a disclosure of the present specification provides an apparatus for an Access and mobility Management Function (AMF) node that selects a Session Management Function (SMF) node.

The apparatus may comprise a transceiver; at least one processor; and at least one memory for storing instructions and operably electrically connectable to the at least one processor. The instructions, based on being executed by the at least one processor, may perform operations comprising: receiving a first message including Application Function (AF) request information from an AF node; selecting or reselecting an SMF based on the AF request information; and transmitting a second message including the AF request information to the selected or reselected SMF.

In order to solve the above-described problems, a disclosure of the present specification provides a non-volatile computer-readable storage medium having recorded thereon instructions. The instructions, when executed by one or more processors mounted on an Access and mobility Management Function (AMF) node, may cause the one or more processors to perform operation comprising: receiving a first message including Application Function (AF) request information from an AF node; selecting or reselecting an SMF based on the AF request information; and transmitting a second message including the AF request information to the selected or reselected SMF.

According to the disclosure of the present specification, it is possible to solve the problems of the prior art.

According to the disclosure of the present specification, it is possible to increase the Quality of Experience (QoE) and quality of a Mobile Edge Computing (MEC) service based on a request from a third party.

In addition, according to the disclosure of the present specification, MEC service can be provided even in a limited network topology environment, and MEC service conforming to a third party's security/policy, etc., can be provided regardless of the network topology, thereby increasing the flexibility of MEC service provision.

BRIEF DESCRIPTION OF THE DRAWINGS

FIG. 5 is another exemplary diagram showing a structure of a radio interface protocol between a UE and a gNB.

DETAILED DESCRIPTION

Figure 1:
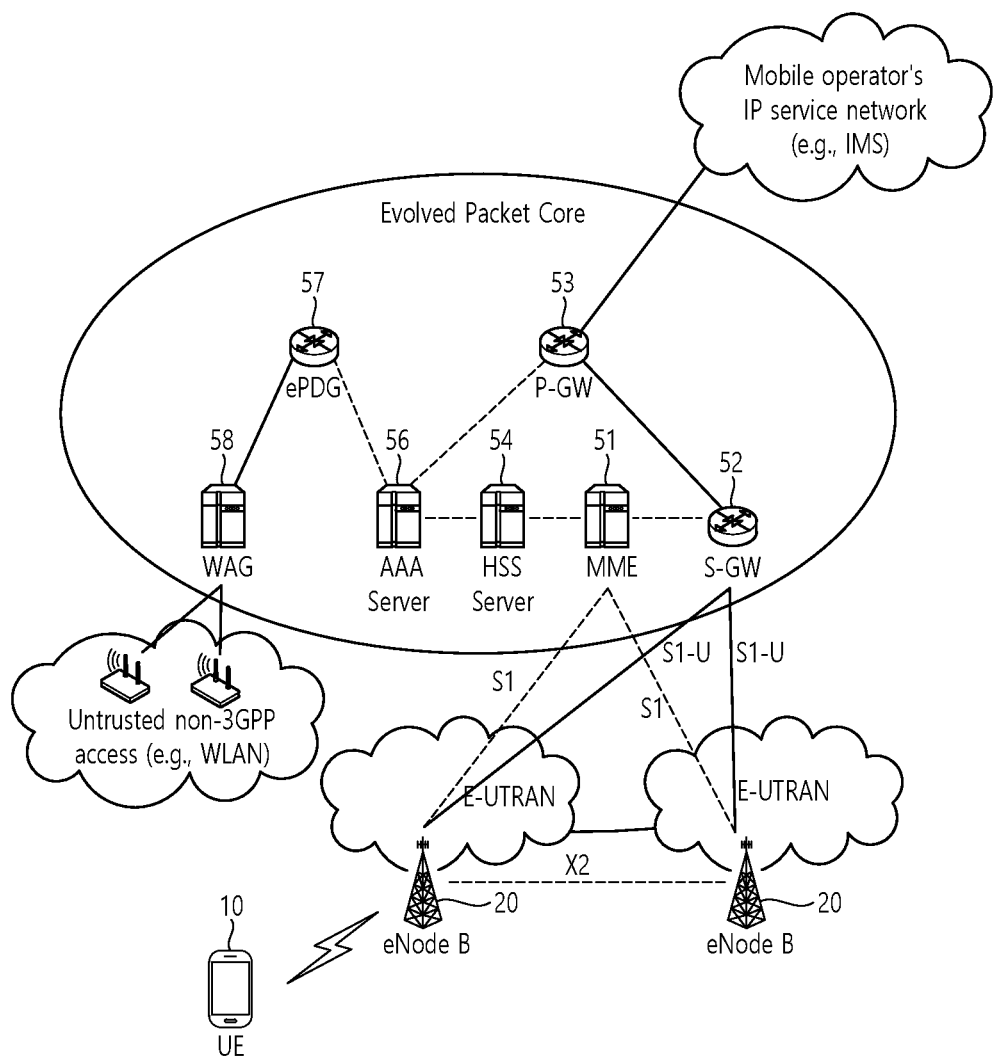
FIG. 1 is a structural diagram of an evolved mobile communication network.
Figure 2:
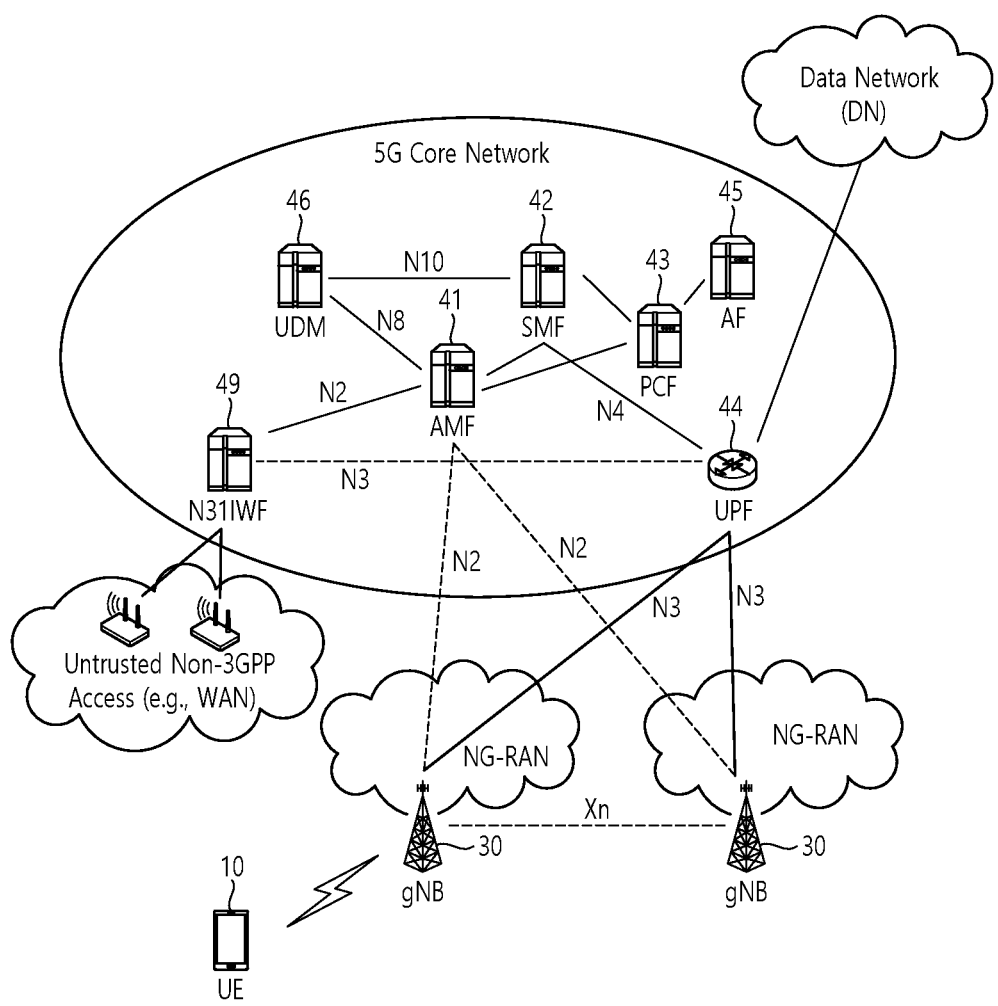
FIG. 2 is a structural diagram of a next-generation mobile communication network.
Figure 3:
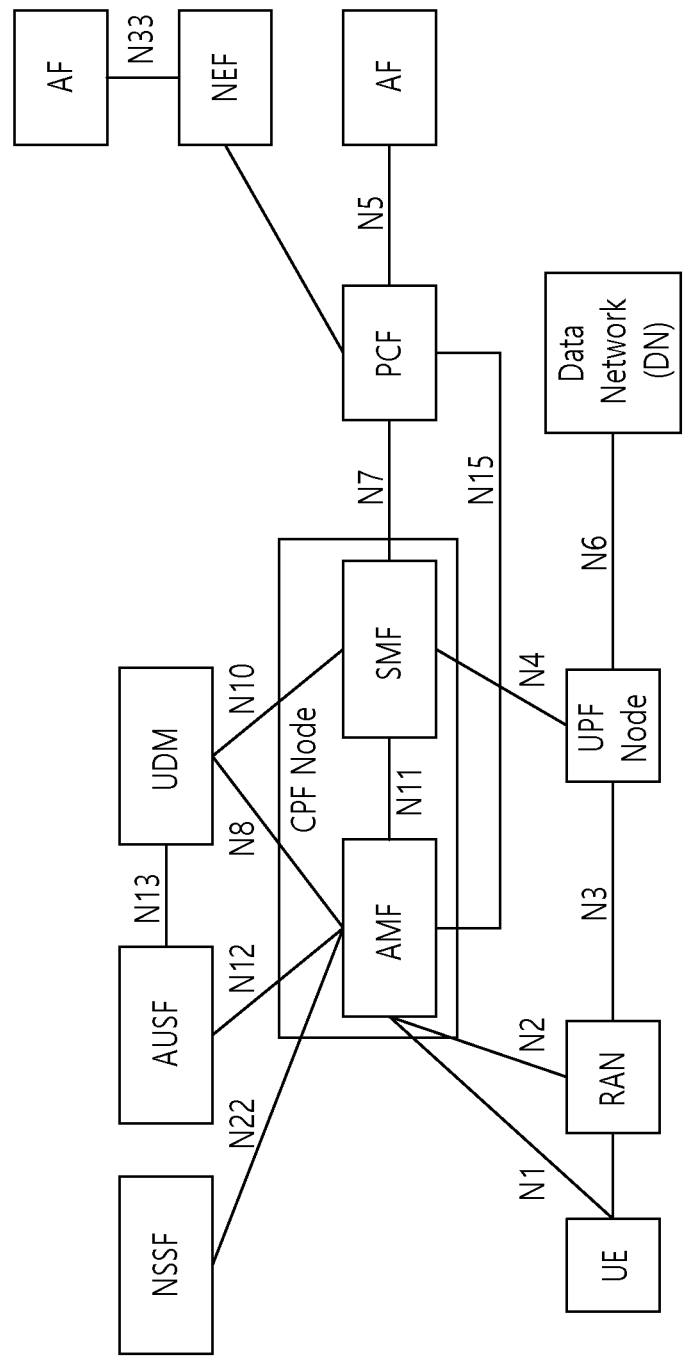
FIG. 3 is an exemplary diagram illustrating a predicted structure of a next generation mobile communication in terms of a node.
Figure 4:
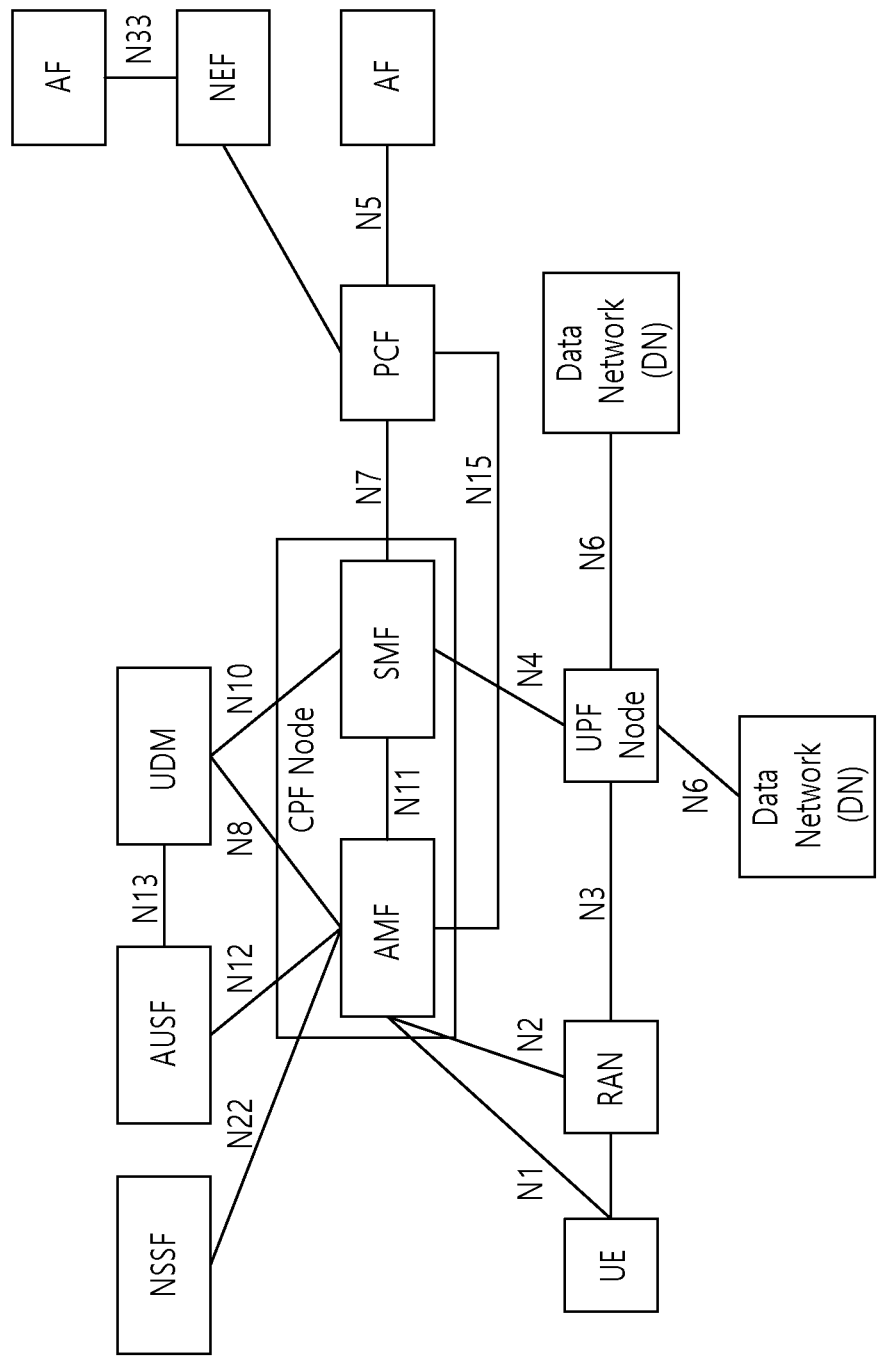
FIG. 4 is an exemplary diagram illustrating an architecture for supporting simultaneously access two data networks.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the disclosure readily understood, but not should be intended to be limiting of the disclosure. It should be understood that the disclosure may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

In the accompanying drawings, a User Equipment (UE) is illustrated by way of example, but the illustrated UE may also be referred to in terms of UE 100 (terminal), Mobile Equipment (ME), and the like. In addition, the UE may be a portable device such as a notebook computer, a mobile phone, a PDA, a smartphone, or a multimedia device or may be a non-portable device such as a PC or vehicle-mounted device.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new Tracking Area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 6A:
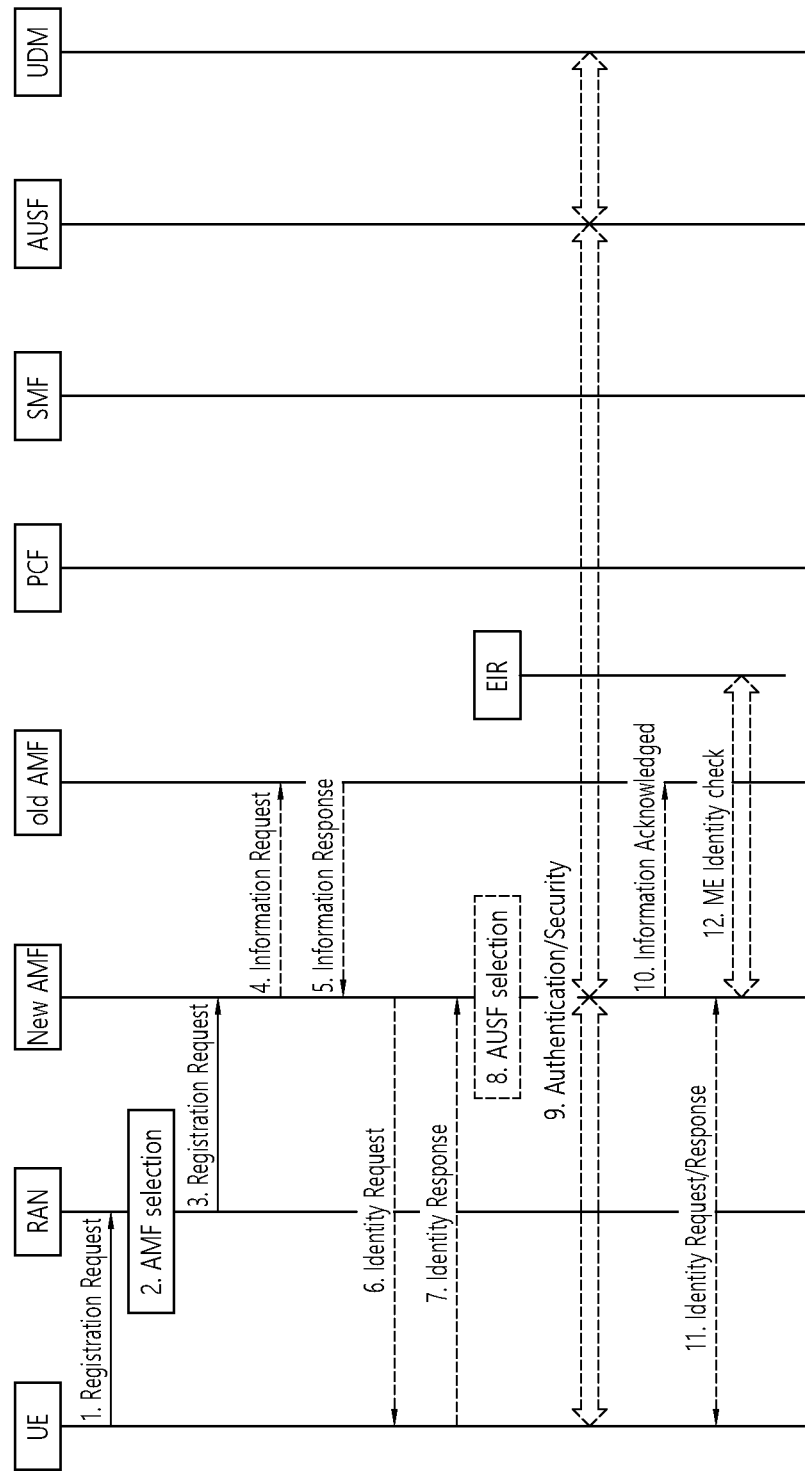
FIGS. 6a and 6b are a signal flowchart illustrating an exemplary registration procedure.
Figure 6B:
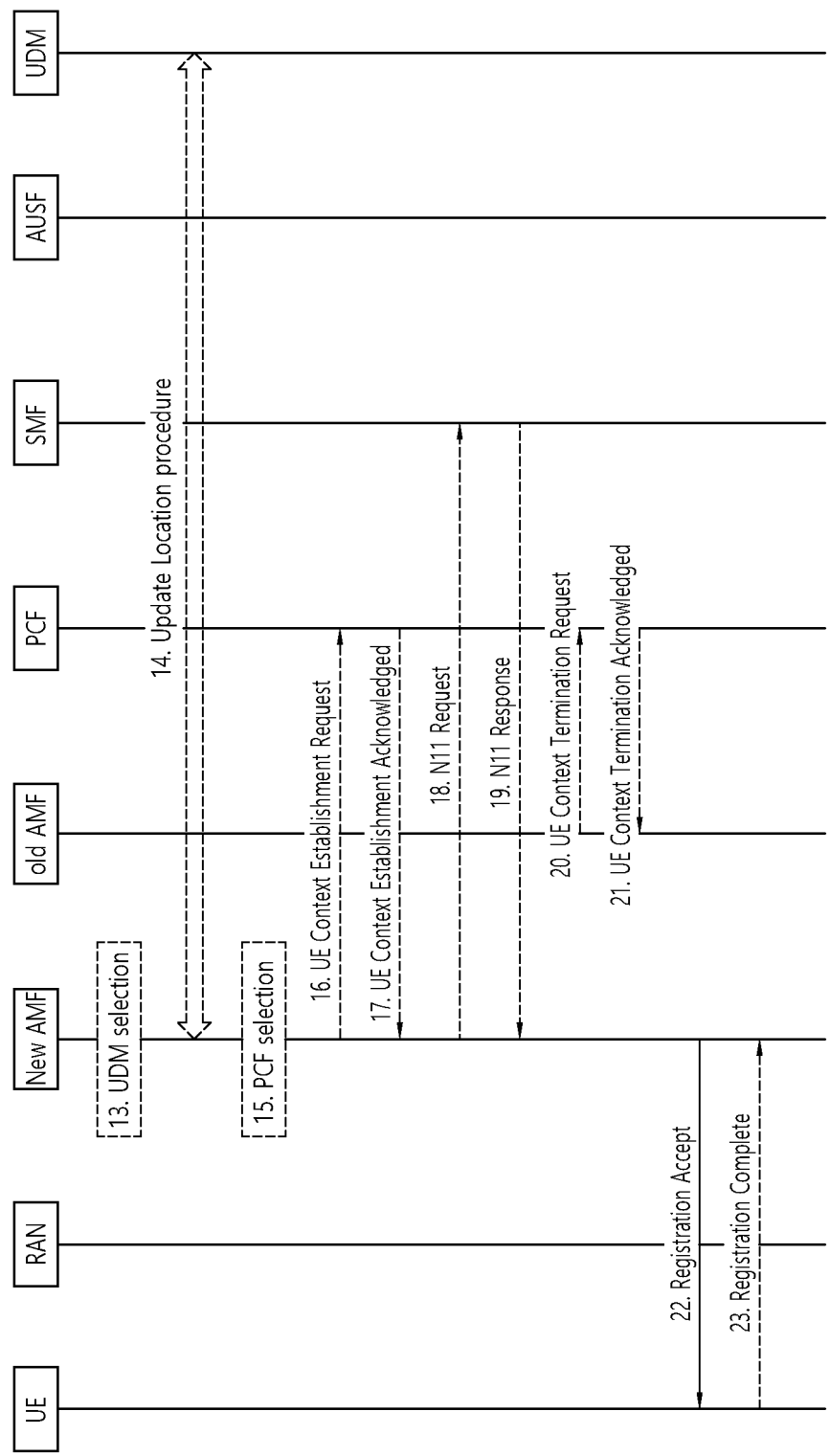

FIGS. 6*a* and 6*b* are a signal flowchart illustrating an exemplary registration procedure.

1) The UE may transmit an AN message to the RAN. The AN message may include an AN parameter and a registration request message. The registration request message may include information, such as a register type, a subscriber permanent ID or temporary user ID, a security parameter, Network Slice Selection Assistance Information (NSSAI), 5G capability of the UE, a Protocol Data Unit (PDU) session status, and so on.

In case of a 5G RAN, the AN parameter may include a Subscription Permanent Identifier (SUPI) or a temporary user ID, a selected network, and NSSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a Public Land Mobile Network (PLMN) other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information on the allowed NSSAI and the mapped NSSAI. The information on the allowed NSSAI information for the UE's access type may be contained within N2 messages containing the registration accept message. The information on the mapped NSSAI is information for mapping each S-NSSAI of the allowed NSSAI to the S-NASSI of the NSSAI set up for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 7A:
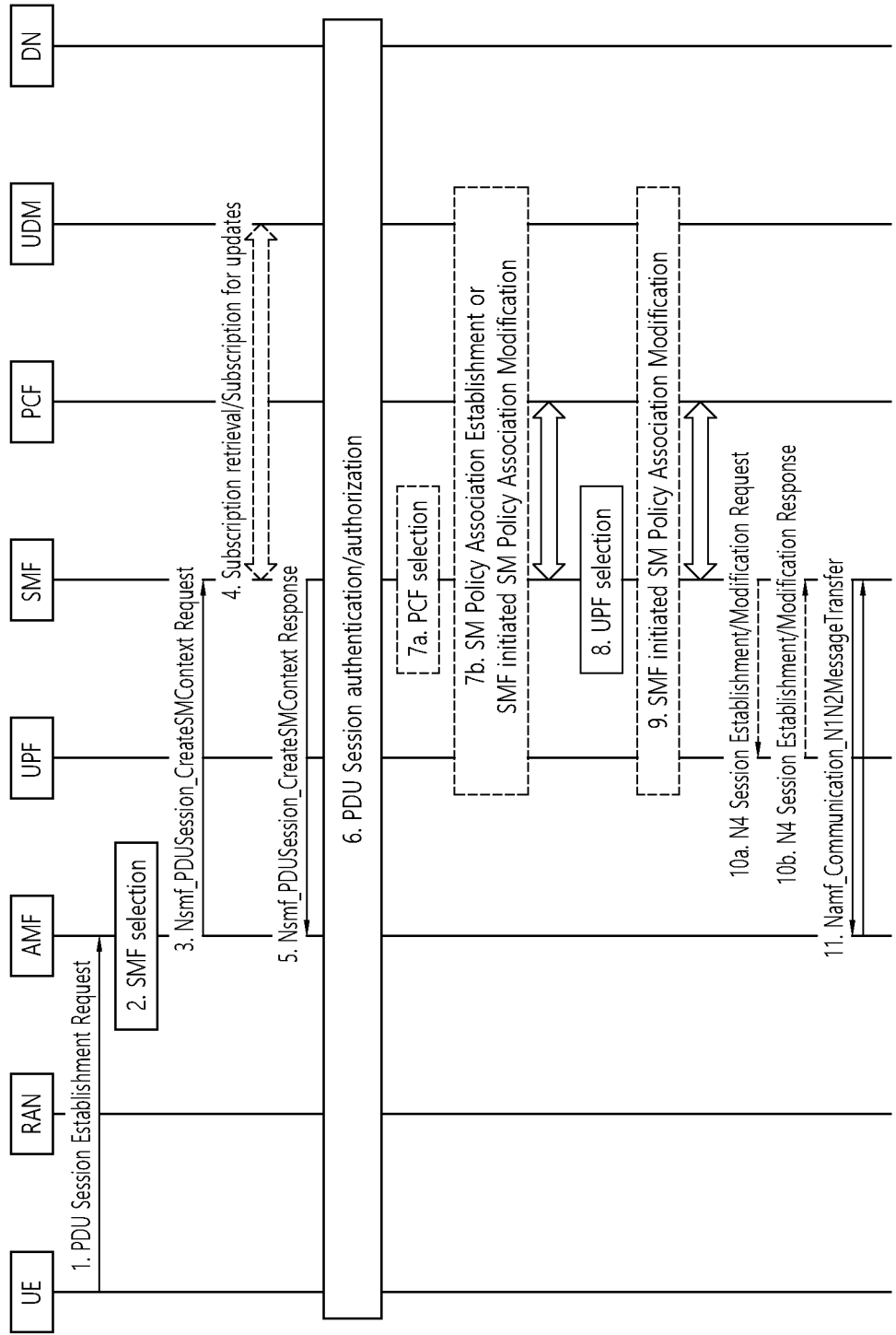
FIGS. 7a and 7b are a signal flowchart illustrating an exemplary PDU session establishment procedure.
Figure 7B:
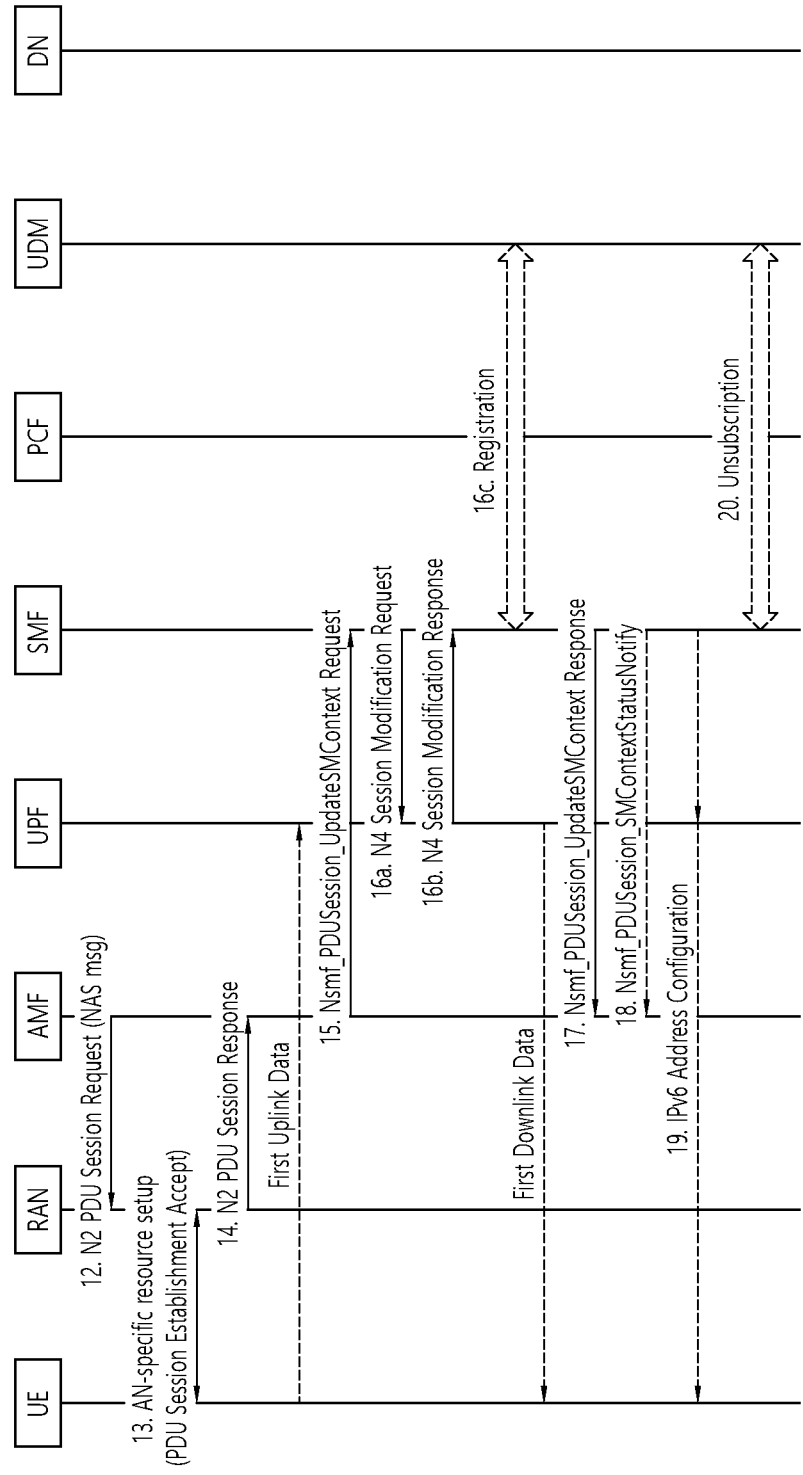

FIGS. 7a and 7b are a signal flowchart illustrating an exemplary PDU session establishment procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits aNAS message to the AMF. The message may include Single-Network Slice Selection Assistance Information (S-NSSAI), DNN, PDU session ID, a Request type, N1 SM information, and so on.

Specifically, the UE includes S-NSSAI from allowed NSSAI for the current access type. If information on the mapped NSSAI has been provided to the UE, the UE may provide both S-NSSAI based on the allowed NSSAI and the corresponding S-NSSAI based on the information on the mapped NSSAI. Here, the information on the mapped NSSAI is information on mapping of each S-NSSAI in the allowed NSSAI to the S-NASSI in the NSSAI set up for HPLMN.

More specifically, the UE may extract and store the allowed NSSAI and the information on the mapped NSSAI, included in the registration accept message received from the network (i.e., AMF) in the registration procedure shown in FIG. 5. Therefore, the UE may transmit by including both S-NSSAI based on the allowed NSSAI and the corresponding S-NSSAI based on the information on the mapped NSSAI in the PDU session establishment request message.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

The AMF may select SMF.

3) The AMF may transmit Nsmf_PDUSession_CreateSMContext Request message or Nsmf_PDUSession_UpdateSMContext Request message to the selected SMF.

The Nsmf_PDUSession_CreateSMContext Request message may include SUPI, DNN, S-NSSAI(s), PDU Session ID, AMF ID, Request Type, PCF ID, Priority Access, N1 SM container, User location information, Access Type, PEI, GPSI, UE presence in LADN service area, Subscription For PDU Session Status Notification, DNN Selection Mode, and Trace Requirements. The SM container may include a PDU Session Establishment Request message.

The Nsmf_PDUSession_UpdateSMContext Request message may include SUPI, DNN, S-NSSAI(s), SM Context ID, AMF ID, Request Type, N1 SM container, User location information, Access Type, RAT type, and PEI. The N1 SM container may include a PDU Session Establishment Request message.

The AMF ID is used to identify the AMF serving the UE. The N1 SM information may include a PDU session establishment request message received from the UE.

4) The SMF transmits a Subscriber Data Request message to the UDM. The Subscriber Data Request message may include a subscriber permanent ID and DNN. The UDM may transmit a Subscription Data Response message to the SMF.

In the above-described step 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits Nsmf_PDUSession_CreateSMContext Response message or Nsmf_PDUSession_UpdateSMContext Response message to the AMF.

The Nsmf_PDUSession_CreateSMContext Response message may include Cause, SM Context ID, or N1 SM container. The N1 SM container may include a PDU Session Reject.

In step 3 above, when the SMF has received the Nsmf_PDUSession_CreateSMContext Request message and the SMF can process the PDU Session establishment request message, the SMF creates SM context and the SM context ID is delivered to the AMF.

6) Secondary authentication/authorization is optionally performed.

7a) If the dynamic PCC is used for the PDU session, the SMF selects the PCF.

7b) The SMF performs an SM policy association establishment procedure in order to establish an SM policy association with the PCF.

8) If the request type in step 3 indicates "initial request", the SMF selects the SSC mode for the PDU session. If step 5 is not performed, SMF may also select UPF. In case of the request type IPv4 or IPv6, the SMF may allocate an IP address/prefix for the PDU session.

9) The SMF provides information on the policy control request trigger condition by performing the SM policy association modification procedure.

10) If the request type indicates "initial request", the SMF may start the N4 session establishment procedure using the selected UPF, otherwise may start the N4 session modification procedure using the selected UPF.

10a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

10b) By transmitting an N4 Session Establishment/Modification response message, the UPF may respond. In case the CN tunnel information is allocated by the UPF, the CN tunnel information may be provided to the SMF.

11) The SMF transmits Namf_Communication_N1N2MessageTransfer message to the AMF. The Namf_Communication_N1N2MessageTransfer message may include PDU Session ID, N2 SM information, and N1 SM container.

The N2 SM information may include PDU Session ID, QoS Flow ID (QFI), QoS Profile(s), CN Tunnel Info, S-NSSAI from the Allowed NSSAI, Session-AMBR, PDU Session Type, User Plane Security Enforcement information, UE Integrity Protection Maximum Data Rate.

The N1 SM container may include a PDU session establishment accept message.

The PDU session establishment accept message may include an allowed QoS rule, SSC mode, S-NSSAI, and an assigned IPv4 address.

12) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

13) The RAN may perform a specific signaling exchange with a UE being related to the information received from the SMF.

The RAN also allocates RAN N3 tunnel information for the PDU session.

The RAN forwards the NAS message, which is provided in the step 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

14) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

15) The AMF may transmit Nsmf_PDUSession_UpdateSMContext Request message to the SMF. The Nsmf_PDUSession_UpdateSMContext Request message may include N2 SM information. Herein, the AMF may forward the N2 SM information received from the RAN to the SMF.

16a) If an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in the step 8.

16b) The UPF may transmit an N4 Session Modification Response message to the SMF.

17) The SMF transmits Nsmf_PDUSession_UpdateSMContext Response message to the AMF.

After this step, the AMF can deliver the related event to the SMF.

18) The SMF transmits Nsmf_PDUSession_SMContextStatusNotify message.

19) The SMF transmits information to the UE through the UPF. More specifically, in case of PDU Type IPv6, the SMF may generate an IPv6 Router Advertisement and may transmit the generated advertisement to the UE through the N4 and UPF.

During the procedure, if the PDU Session Establishment is not successful, the SMF notifies this to the AMF.

<Edge Computing>

In 5G, edge computing is being discussed. Several architectures can be considered for edge computing.

Figure 8:
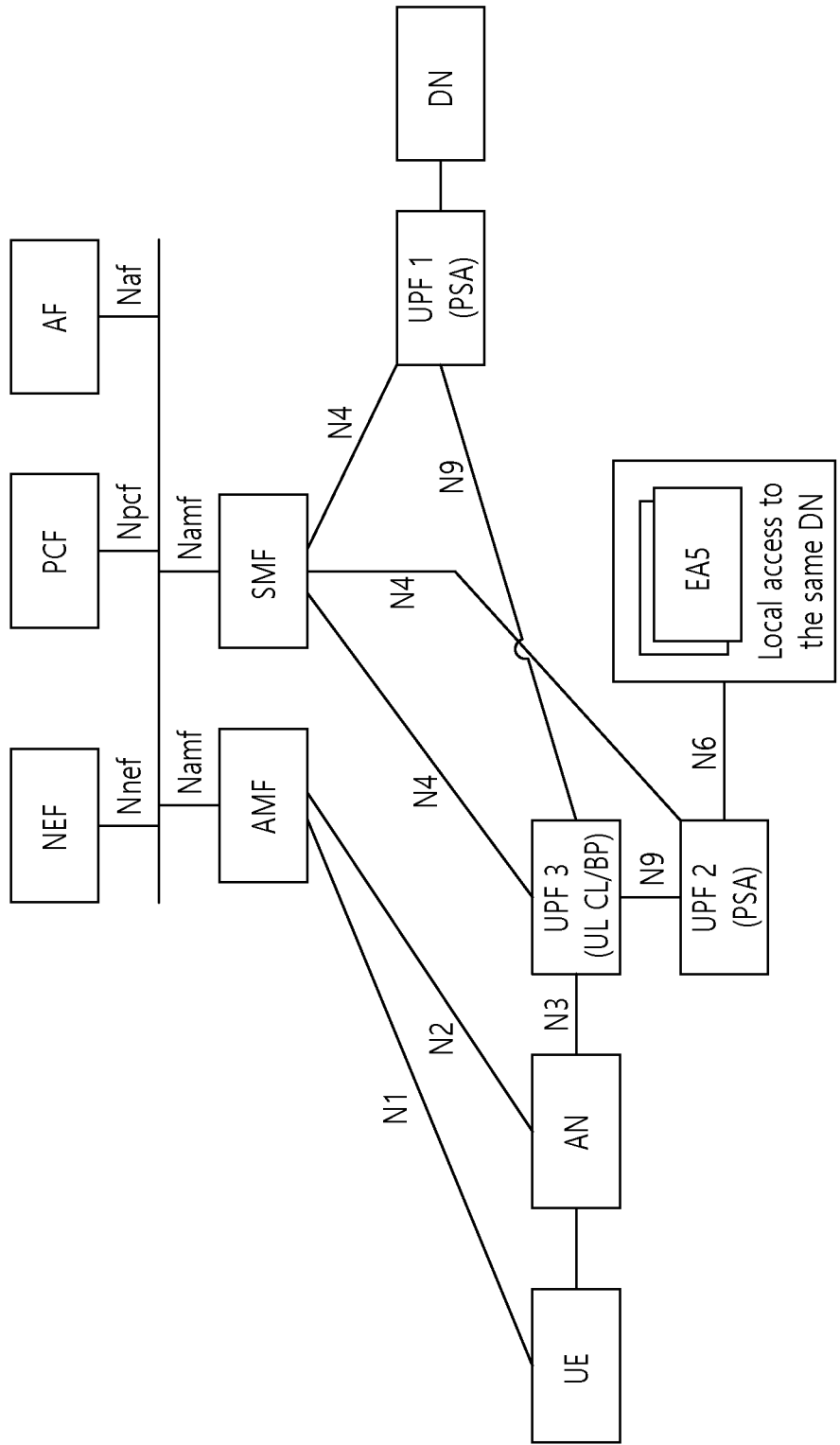
FIG. 8 shows an architecture for an Edge Application Server (EAS).

FIG. 8 shows an architecture for an Edge Application Server (EAS).

Referring to FIG. 8, a Data Network (DN) is connected to UPF 1 operating as a PDU Session Anchor (PSA). And the EAS is connected to UPF 2 operating as a PSA. The UPF 1 and UPF 2 are connected to UPF 3 operating as an Uplink Classifier (UL-CL)/Branching Point (BP).

All UPFs are connected to one SMF.

The illustrated architectures should be able to support a scenario where UEs are not aware of edge computing. In addition, the illustrated architectures should be able to support a scenario where UEs are edge computing aware. The illustrated architectures should be able to support a scenario where applications are not aware of edge computing.

Application clients within the UE can use edge computing without any special logic.

<Introduction of I-SMF>

Figure 9:
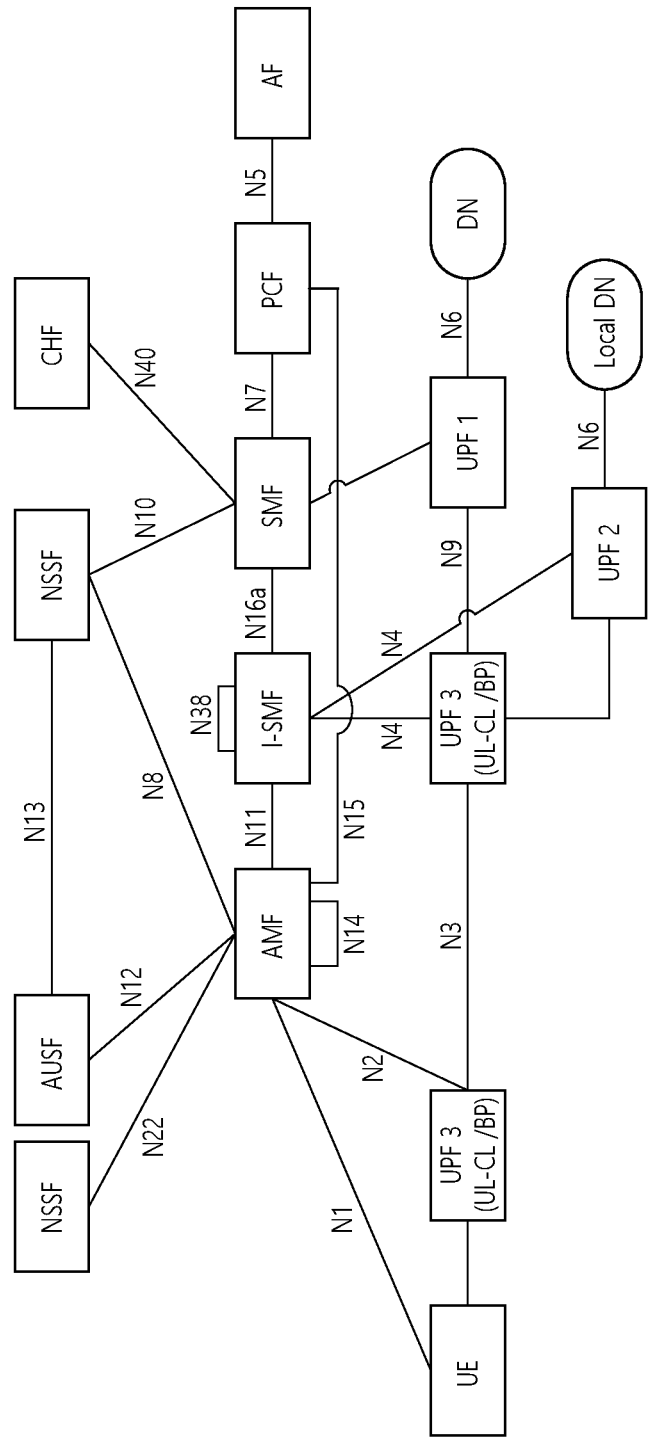
FIG. 9 shows an architecture in which an Intermediate SMF (I-SMF) is introduced.

FIG. 9 shows an architecture in which an Intermediate SMF (I-SMF) is introduced.

As can be seen with reference to FIG. 9, UPF 1 is connected to a DN, and UPF 2 is connected to a local DN. The UPF 1 may be connected to the SMF, and the UPF 2 may be connected to the I-SMF.

<Traffic Routing>

On the other hand, the activation of traffic routing to the local DN for each Application Function (AF) request will be described.

In order to enable traffic routing to the local DN, a Data Network Access Identifier (DNAI) may be configured in the SMF.

The AF may send requests that affect SMF routing decisions for PDU session traffic. The AF's request affects the selection or reselection of the UPF, and the routing of user traffic to local access to the DN by DNAI.

The AF may send the request on behalf of an application not provided by the PLMN serving the UE.

If the operator does not allow the AF to access the network directly, the AF can use the NEF to interact with the 5GC.

The AF may be responsible for reselection or reallocation of applications within the local DN.

The AF may request notification of events related to PDU sessions.

The AF request may be forwarded to the PCF through the N5 interface or through the NEF.

The PCF may convert the AF request into a policy applied to the PDU session.

When the SMF receives a PCC rule to enable traffic routing to the local DN, the SMF may check whether the requested DNAI is supported by the SMF or the I-SMF. If neither SMF nor I-SMF support the requested DNAI, the SMF may not be able to enable the traffic routing setup to the local DN.

The AF request information may be stored in the UDR by the NEF.

<Problems to be Solved by the Disclosure of the Present Specification>

As described above, the AF request may affect the selection or reselection of the UPF, but not the SMF selection.

On the other hand, in order to route traffic to the local DN by selecting the I-SMF, an interface may exist between the I-SMF and the SMF as shown in FIG. 9.

However, in an edge computing environment for providing various services using 5G, it is necessary to consider a unique situation. For example, there may be a situation in which a third party service provider wants to use a dedicated SMF or UPF for reasons of security or its own policy. Therefore, there is a need for a control method capable of routing traffic to a local DN without using an interface between I-SMF and SMF.

<Disclosure of the Present Specification>

The disclosures of the present specification provide methods for solving the above-described problems.

The disclosures of the present specification consist of a combination of one or more operations/configurations/steps described below.

I. Overview of the Disclosures of the Present Specification

I-1. Network Node Function

The AF of the third party or the AF of the mobile operator sends a request to the core network to use the UPF with the dedicated control node in a specific location and in a specific situation (time/place, etc.).

The request may include the DNAI and AF request level. The DNAI may be information necessary for SMF and UPF selection. The AF request level may be a simple indication divided into on/off and 0/1, but may have various levels according to the business agreement between the operator and the service provider, and the level is considered as one of the basic information for new SMF selection.

I-1-2. Network Control Node (e.g., AMF)

SMF selection is performed according to the information received from the AF (DNAI, AF request level, or a changed indication recognized by the core network).

The SMF selection result by the AF request is sent to the SMF, providing information that can trigger change of the UP path.

I-2. UE Function

The UE may perform procedures such as deactivation/release and re-activation/re-establishment of a PDU session based on information obtained directly or indirectly from the network.

II. Implementation Example

Although each of the following drawings shows an embodiment of each disclosure, the embodiments of the drawings may be implemented in combination with each other.

Figure 10:
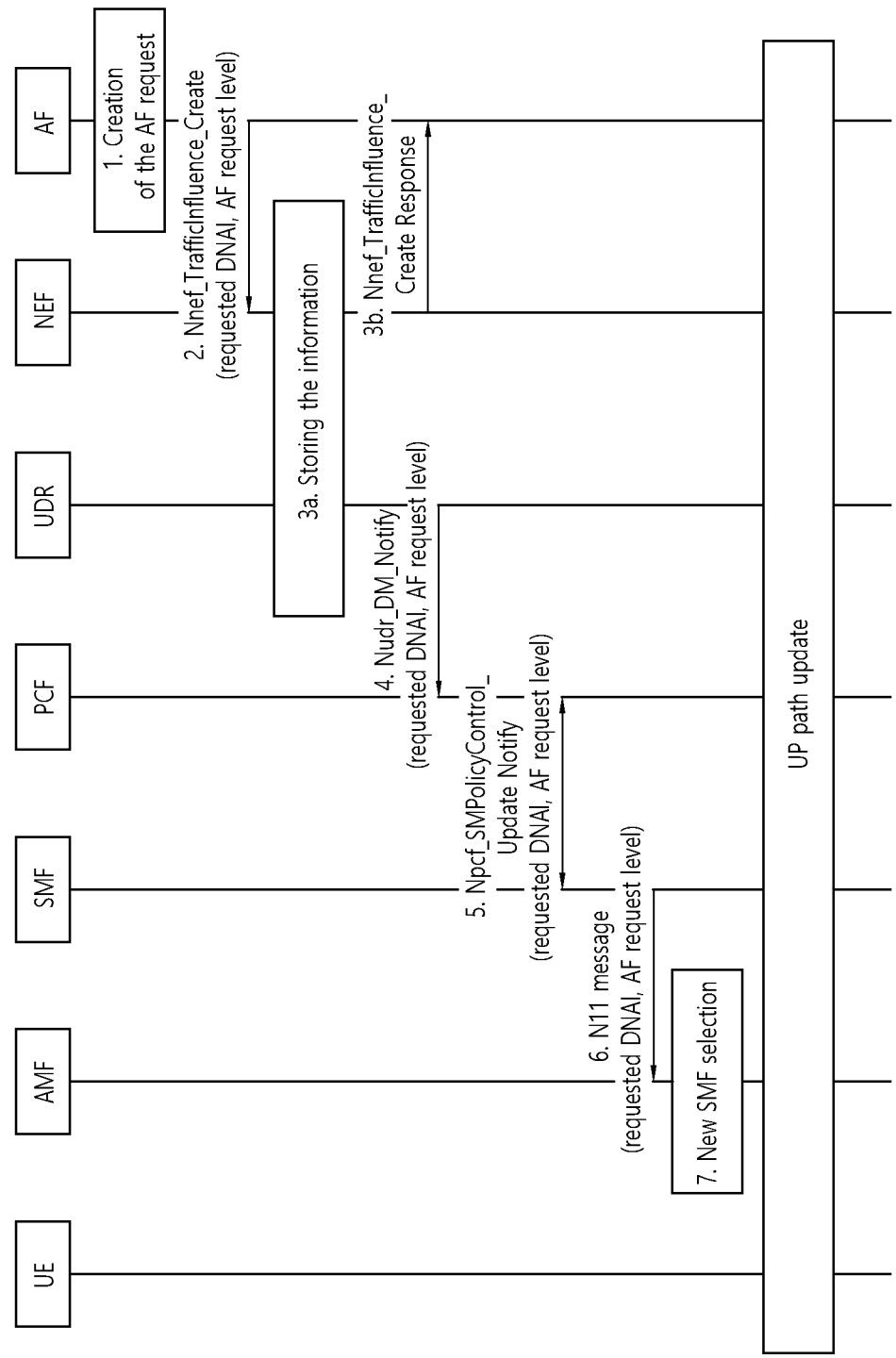
FIG. 10 is an exemplary diagram illustrating a signal flow according to one disclosure of the present specification.

FIG. 10 is an exemplary diagram illustrating a signal flow according to one disclosure of the present specification.

1) Referring to FIG. 10, the AF generates its own request, i.e., the AF request.

2) The AF transmits Nnef_TrafficeInfluence_Create message including information on the AF request. The information on the AF request may include a requested DNAI and AF request level.

3a) The NEF requests to store the information on the AF request in the Unified Data Repository (UDR).

3b) Then, the NEF transmits Nnef_TrafficeInfluence_Create Response message to the AF.

4) The UDR transmits Nudr_DM_Notify message including the AF request information (i.e., including the requested DNAI and AF request level information) to a Policy Control Function (PCF).

5) The PCF exchanges Npcf_SMPolicyControl_UpdateNotify message including the AF request information (i.e., the requested DNAI and AF request level information) with the SMF.

6) The SMF transmits an N11 message including the AF request information (i.e., including the requested DNAI and AF request level information) to the AMF.

7) Then, the AMF selects a new SMF.

Thereafter, the UP path may be updated.

Figure 11:
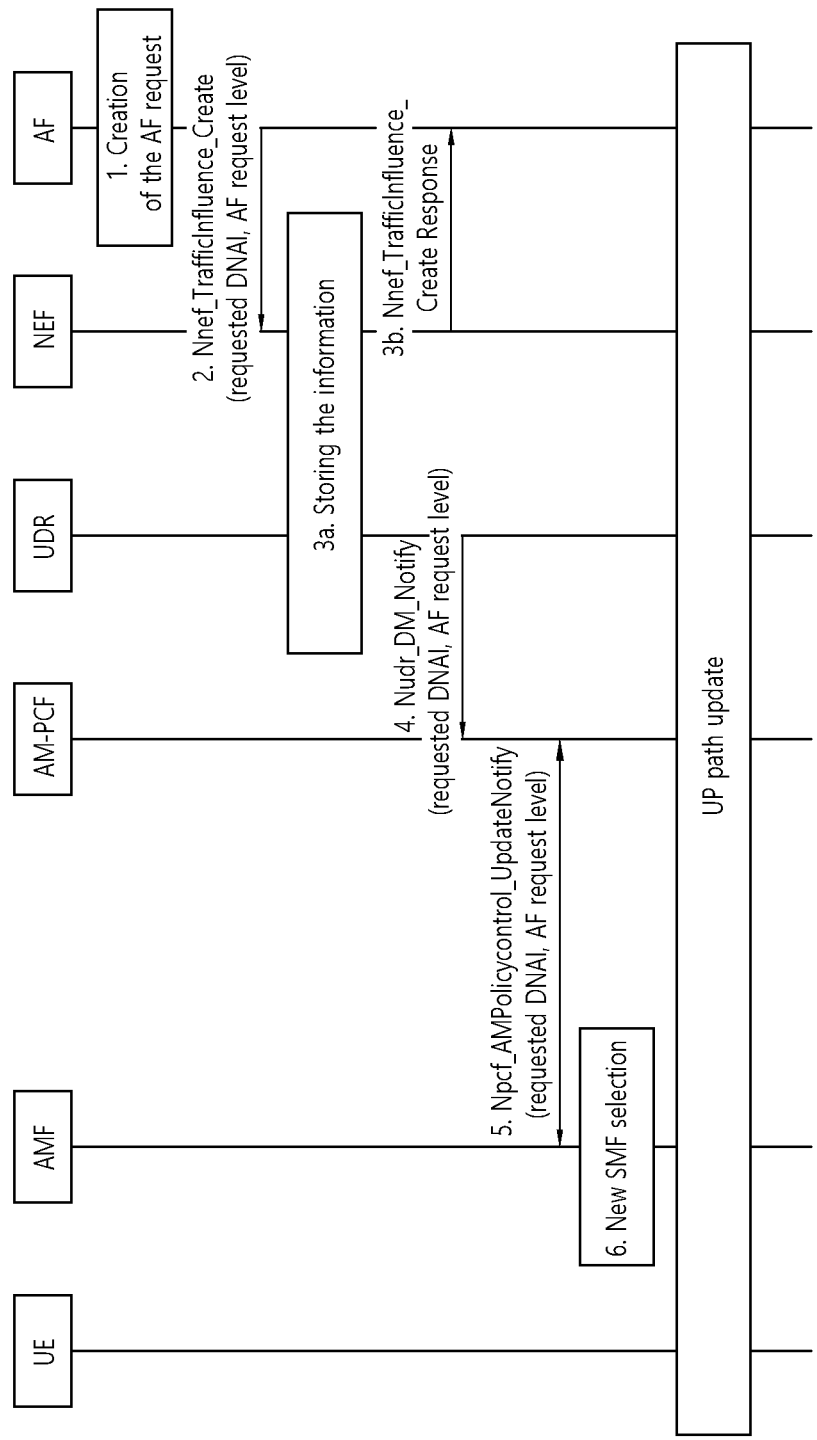
FIG. 11 is an exemplary diagram illustrating a signal flow according to one disclosure of the present specification.

FIG. 11 is an exemplary diagram illustrating a signal flow according to one disclosure of the present specification.

1) Referring to FIG. 11, the AF generates its own request, the AF request. Then, the AF transmits Nnef_TrafficeInfluence_Create message including information on the AF request. The information on the AF request may include a requested DNAI and AF request level.

2) And the AF transmits Nnef_TrafficeInfluence_Create message including the AF request information (i.e., including the requested DNAI and AF request level information).

3a) The NEF requests to store the AF request information (i.e., including the requested DNAI and AF request level information) in the UDR.

3b) Then, the NEF transmits Nnef_TrafficeInfluence_Create Response message to the AF.

4) The UDR transmits a Nudr_DM_Notify message including the AF request information (i.e., including the requested DNAI and AF request level information) to the AM-PCF.

5) The AM-PCF exchanges Npcf_AMPolicyControl_UpdateNotify message including the AF request information (i.e., the requested DNAI and AF request level information) with the AMF.

6) Then, the AMF selects a new SMF.

Thereafter, the UP path may be updated.

Figure 12:
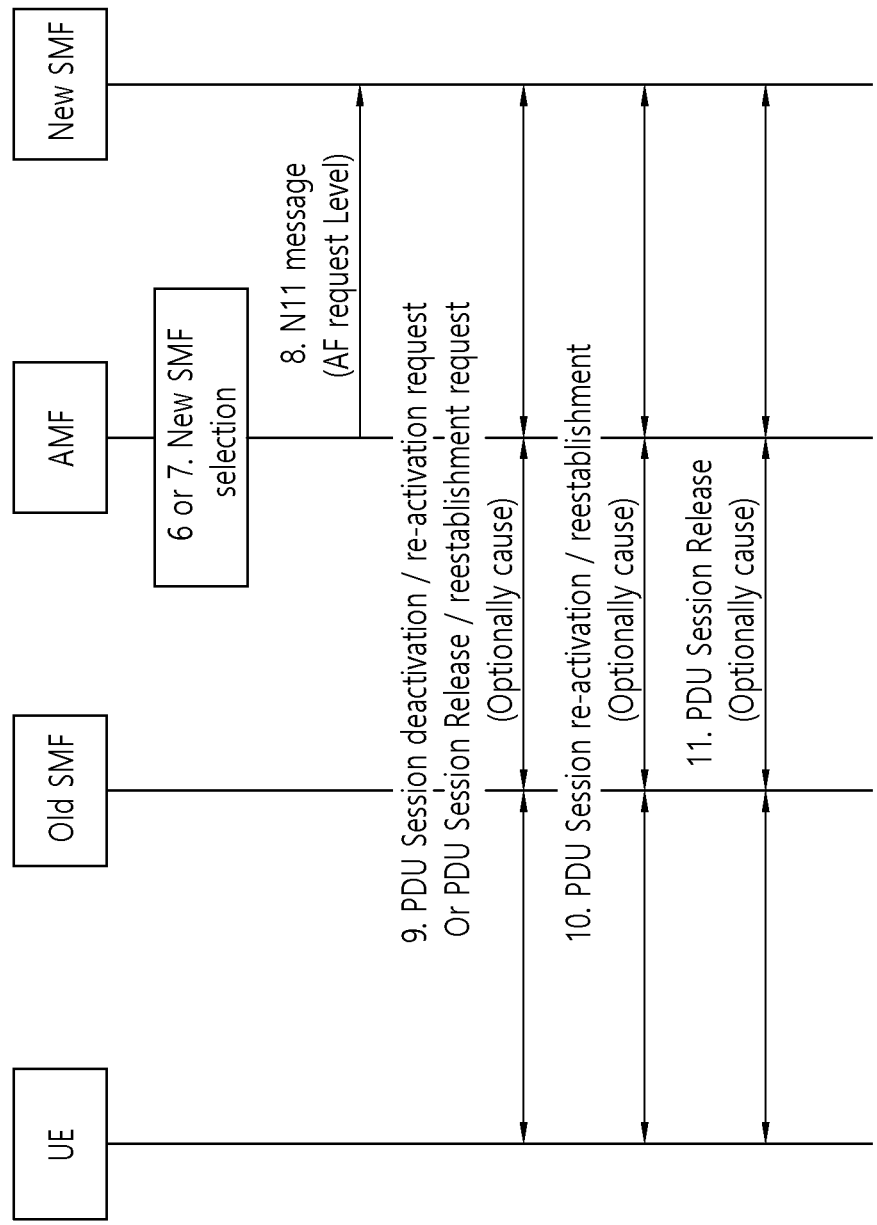
FIG. 12 is an exemplary diagram illustrating in detail a process of updating the UP path after step 7 shown in FIG. 10 and step 6 shown in FIG. 11.

FIG. 12 is an exemplary diagram illustrating in detail a process of updating the UP path after step 7 shown in FIG. 10 and step 6 shown in FIG. 11.

8) The AMF may transmit an N11 message including AF request information (e.g., including AF request level information) to the selected new SMF.

9) Thereafter, a PDU session deactivation or release procedure may be performed. To this end, a PDU session deactivation request message or a PDU session release request message may be transmitted and received.

10) Thereafter, the PDU session re-activation or re-establishment procedure may be performed. To this end, a PDU session re-activation request message or a PDU session re-establishment request message may be transmitted/received.

When the new SMF receives the message, it requests the UPF to change the path of the PDU session.

11) Meanwhile, the UE may perform procedures such as deactivation/release and re-activation/re-establishment of a PDU session based on a cause or direct/indirect information in the received message.

III. Brief Summary of the Disclosures of the Present Specification

The AF may transmit information for using a network node in a specific network topology environment to the core network.

The information transmitted by the AF may include AF request level information. The AF request level may mean a request level negotiated with a service provider to provide a service.

The network control node receiving the information from the AF, e.g., the AMF, selects the SMF as the session management control node, and may directly/indirectly inform the SMF that the selection is based on the AF request.

The UE may perform procedures such as deactivation/release and re-activation/re-establishment of the PDU session based on cause information or direct/indirect information in the received message.

Hereinafter, an apparatus to which the above disclosure of the present specification can be applied will be described.

Figure 13:
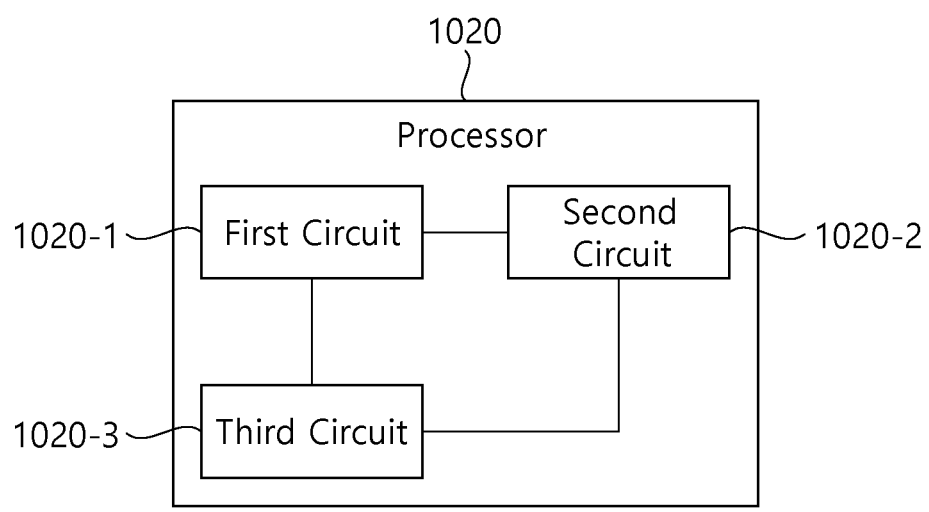
FIG. 13 shows a block diagram of a processor in which the disclosure of the present specification is implemented.

FIG. 13 shows a block diagram of a processor in which the disclosure of the present specification is implemented.

As can be seen with reference to FIG. 13, a processor 1020 in which the disclosure of the present specification is implemented includes a plurality of circuitry to implement the proposed functions, procedures and/or methods described herein. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be referred to as an Application-Specific Integrated Circuit (ASIC) or an Application Processor (AP), and may include at least one of a Digital Signal Processor (DSP), a Central Processing Unit (CPU), and a Graphics Processing Unit (GPU).

The processor may be included in the UE, the base station, the AMF or the SMF.

A case in which the processor is included in the AMF will be described.

The first circuit 1020-1 of the processor included in the AMF may receive a first message including AF request information from an Application Function (AF) node.

The second circuit 1020-2 of the processor included in the AMF may select or reselect the SMF based on the AF request information.

The third circuit 1020-3 of the processor included in the AMF may transmit a second message including the AF request information to the selected or reselected SMF.

The first message may be an N11 or N15 message.

The AF request information may include: a requested Data Network Access Identifier (DNAI) and an AF request level.

The SMF may be selected or reselected based on the DNAI.

The SMF may be selected or reselected based on the AF request level.

The transmission of the second message to the selected or reselected SMF may trigger a change of a User Plane (UP) path.

The change of the UP path includes: performing a PDU session deactivation or release procedure; and performing the PDU session re-activation or re-establishment procedure.

Figure 14:
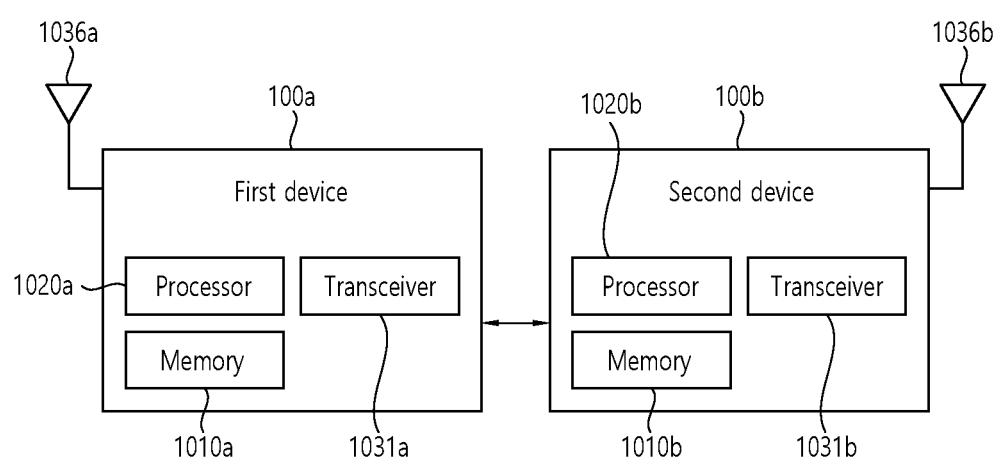
FIG. 14 illustrates a wireless communication system according to an embodiment.

FIG. 14 illustrates a wireless communication system according to an embodiment.

Referring to FIG. 14, the wireless communication system may include a first device 100*a* and a second device 100*b*.

The first device 100*a* may be a UE described in the disclosure of the present specification. Or, the first device 100*a* may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100*b* may be a network node (e.g., AMF or MME) described in the disclosure of the present specification. Or, the second device 100*b* may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100*a* may include at least one processor such as a processor 1020*a*, at least one memory such as memory 1010*a*, and at least one transceiver such as a transceiver 1031*a*. The processor 1020*a* may perform the above-described functions, procedures, and/or methods. The processor 1020*a* may perform one or more protocols. For example, the processor 1020*a* may perform one or more layers of a radio interface protocol. The memory 1010*a* is connected to the processor 1020*a*, and may store various forms of information and/or instructions. The transceiver 1031*a* is connected to the processor 1020*a*, and may be controlled to transmit and receive radio signals.

The second device 100*b* may include at least one processor such as a processor 1020*b*, at least one memory device such as memory 1010*b*, and at least one transceiver such as a transceiver 1031*b*. The processor 1020*b* may perform the above-described functions, procedures and/or methods. The processor 1020*b* may implement one or more protocols. For example, the processor 1020*b* may implement one or more layers of a radio interface protocol. The memory 1010*b* is connected to the processor 1020*b*, and may store various forms of information and/or instructions. The transceiver 1031*b* is connected to the processor 1020*b* and may be controlled transmit and receive radio signals.

The memory 1010*a* and/or the memory 1010*b* may be connected inside or outside the processor 1020*a* and/or the processor 1020*b*, respectively, and may be connected to another processor through various technologies, such as a wired or wireless connection.

The first device 100*a* and/or the second device 100*b* may have one or more antennas. For example, an antenna 1036*a* and/or an antenna 1036*b* may be configured to transmit and receive radio signals.

Figure 15:
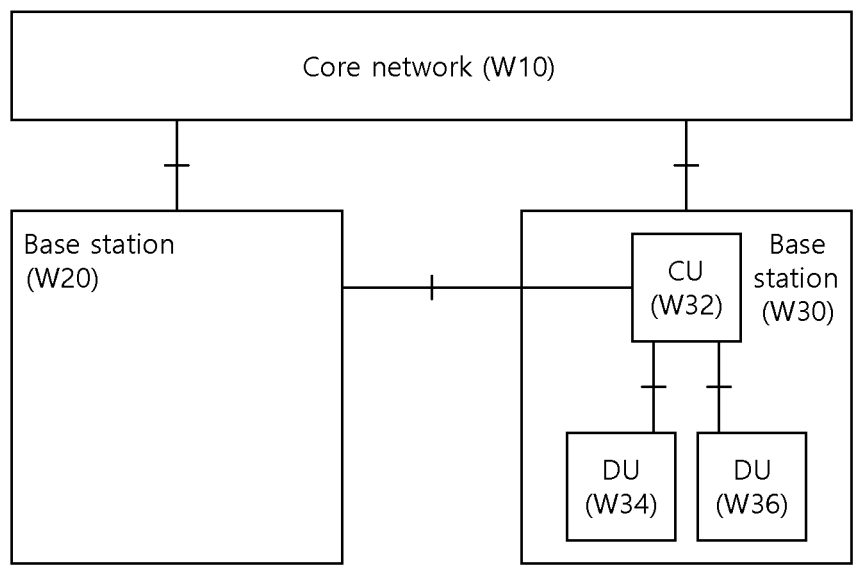
FIG. 15 illustrates a block diagram of a network node according to an embodiment.

FIG. 15 illustrates a block diagram of a network node according to an embodiment.

In particular, FIG. 15 is a diagram illustrating in detail a case in which a base station is divided into a Central Unit (CU) and a Distributed Unit (DU).

Referring to FIG. 15, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 16:
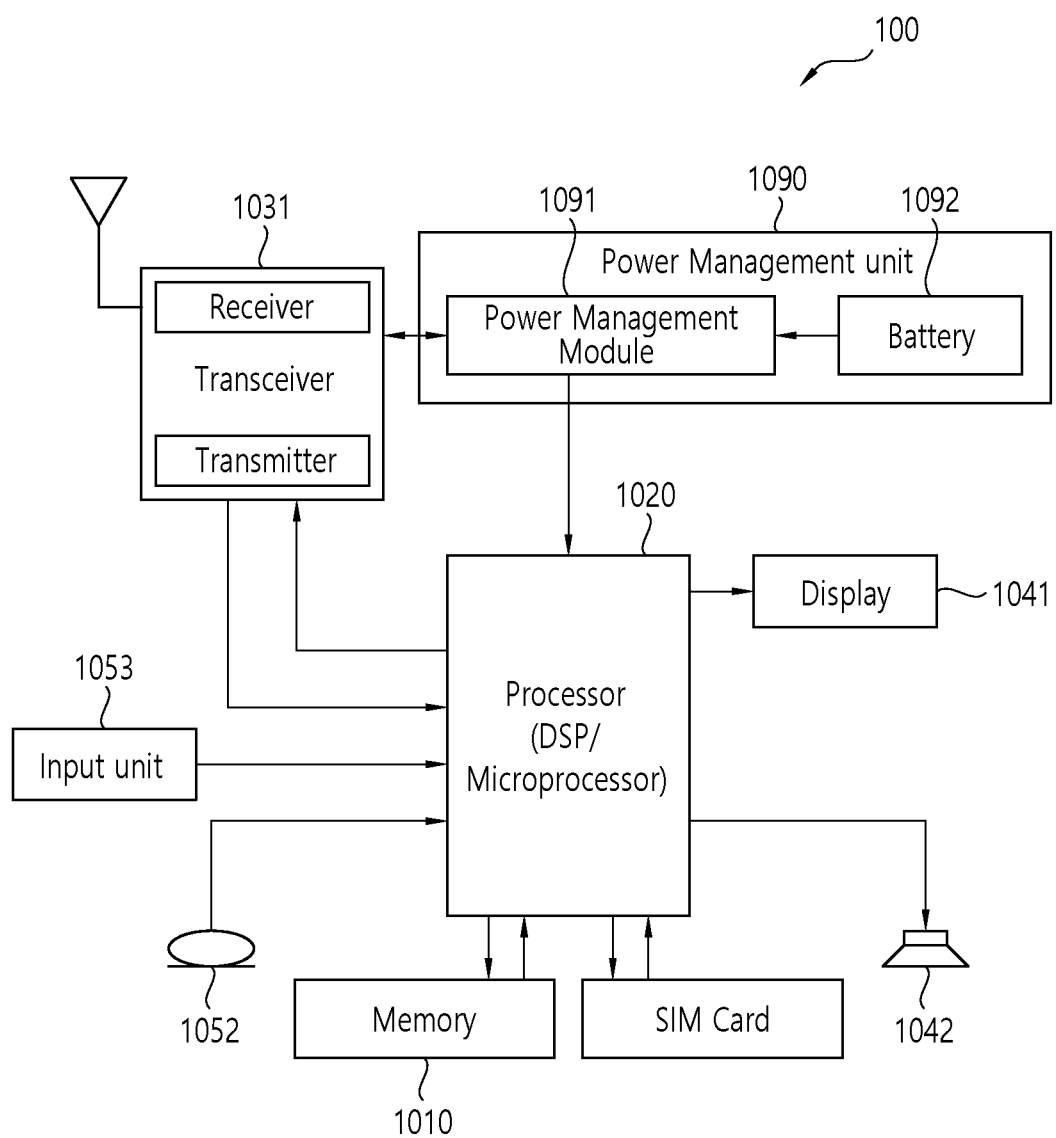
FIG. 16 is a block diagram illustrating a configuration of a UE according to an embodiment.

FIG. 16 is a block diagram illustrating a configuration of a UE according to an embodiment.

In particular, the UE 100 shown in FIG. 16 is a diagram illustrating the first device in FIG. 14 in more detail.

A UE 100 includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is coupled with the processor 1020 in a way to operate and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is connected to the processor 1020 in a way to operate and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 17:
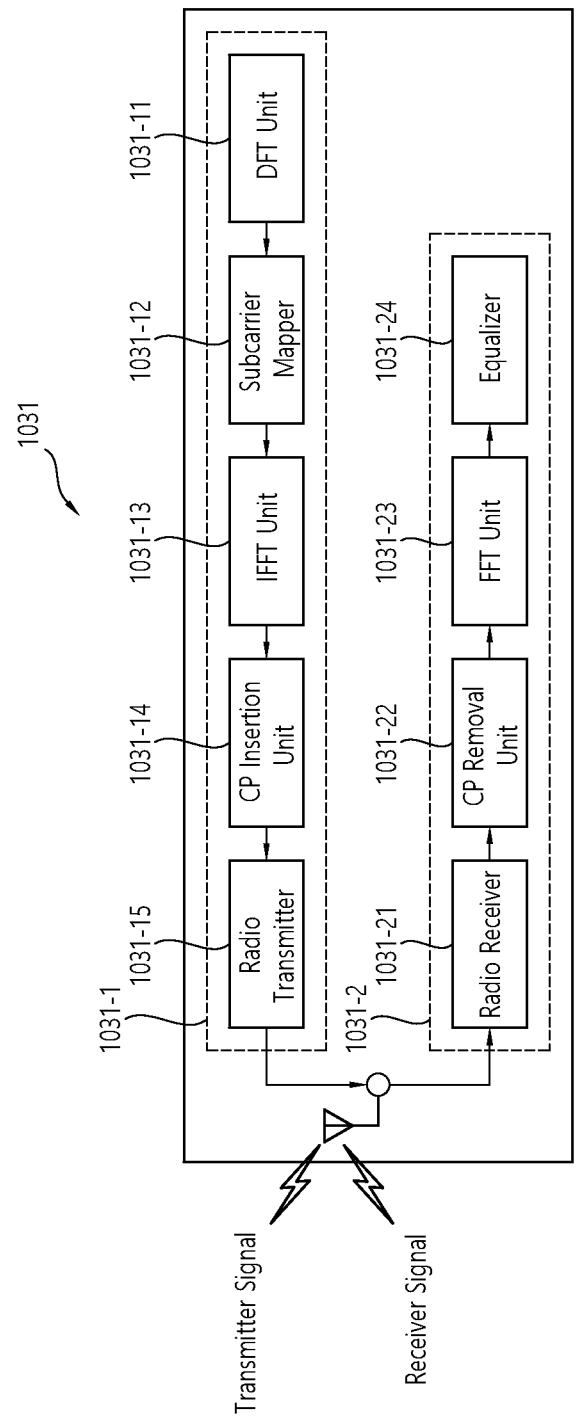
FIG. 17 is a detailed block diagram illustrating the transceiver of the first device shown in FIG. 14 or the transceiver of the device shown in FIG. 16 in detail.

FIG. 17 is a detailed block diagram illustrating the transceiver of the first device shown in FIG. 14 or the transceiver of the device shown in FIG. 16 in detail.

Referring to FIG. 17, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

<Scenario to which the Disclosure of the Present Specification can be Applied>

Although not limited thereto, various descriptions, functions, procedures, suggestions, methods and/or operational flowcharts of the disclosures of the present specification disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 18:
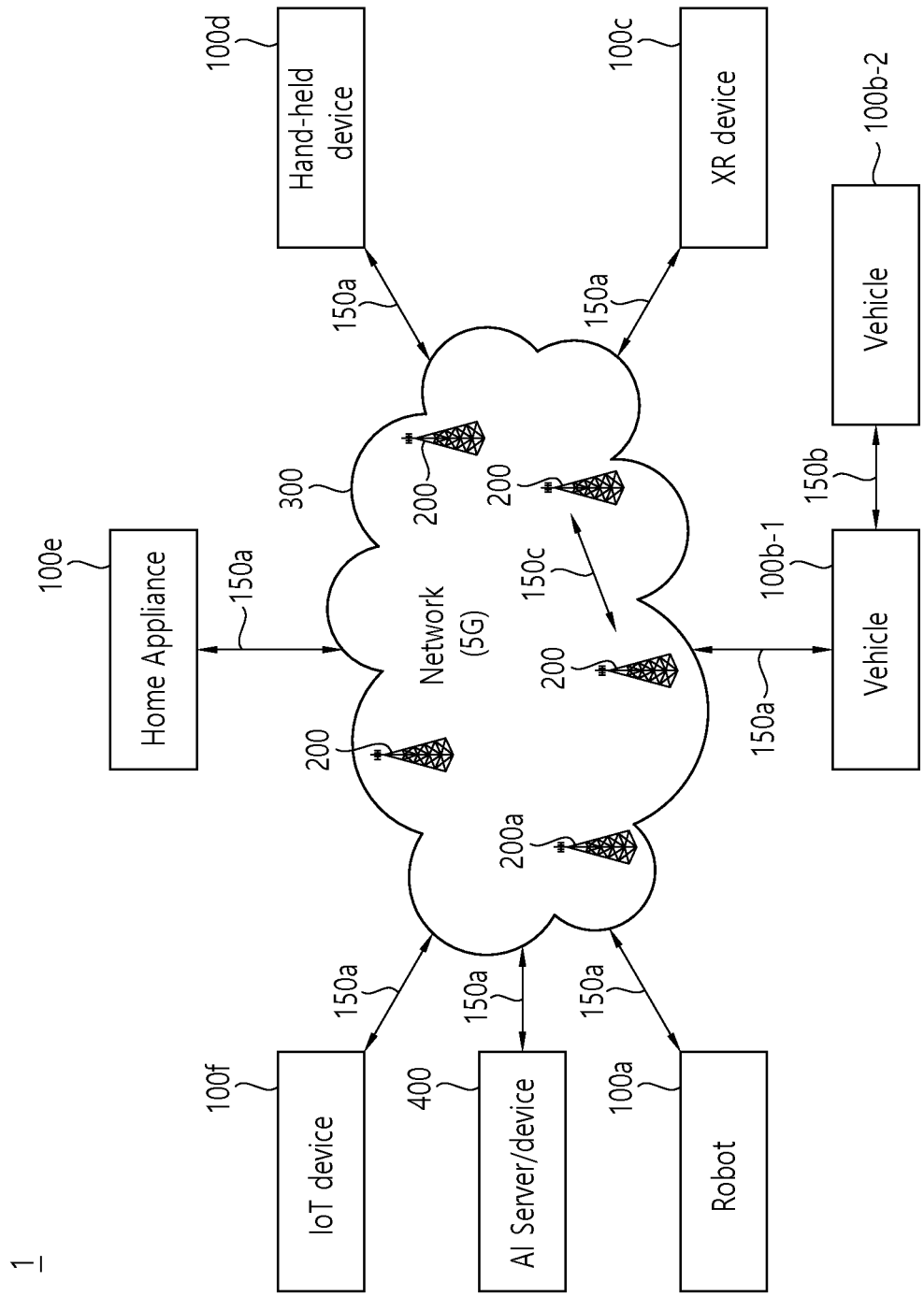
FIG. 18 illustrates a communication system 1 applied to the disclosure of the present specification.

FIG. 18 illustrates a communication system 1 applied to the disclosure of the present specification.

Referring to FIG. 18, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e, an Internet-of-Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method performed by an Access and mobility Management Function (AMF) adapted to operate in a wireless communication system, the method comprising:
    receiving a first message including Application Function (AF) request information from an AF,
    wherein the AF request information includes AF request level information, and
    wherein the AF request level information includes information for one or more levels according to a business agreement between an operator and a service provider;
    determining whether to select a dedicated Session Management Function (SMF) based on the AF request information; and
    based on determining to select the dedicated SMF, transmitting a second message including the AF request information to the dedicated SMF,
    wherein the second message informs that selection of the dedicated SMF is based on AF request.

2. The method of claim 1, wherein the first message is an N11 message or an N15 message.

3. The method of claim 1, wherein the AF request information further includes a requested Data Network Access Identifier (DNAI).

4. The method of claim 1, wherein a transmission of the second message to the dedicated SMF triggers a change of a User Plane (UP) path.

5. The method of claim 4, wherein the change of the UP path comprises:
    performing a deactivation or a release procedure of a Protocol Data Unit (PDU) session; and
    performing a re-activation or a re-establishment procedure of the PDU session.

6. A chipset mounted on an Access and Mobility Management Function (AMF) adapted to operate in a wireless communication system, the chipset comprising:
    at least one processor;
    at least one memory for storing instructions and operably electrically connectable to the at least one processor,
    wherein the instructions, based on being executed by the at least one processor, perform operations comprising:
    receiving a first message including Application Function (AF) request information from an AF,
    wherein the AF request information includes AF request level information, and
    wherein the AF request level information includes information for one or more levels according to a business agreement between an operator and a service provider;
    determining whether to select a dedicated Session Management Function (SMF) based on the AF request information; and
    based on determining to select the dedicated SMF, transmitting a second message including the AF request information to the dedicated SMF,
    wherein the second message informs that selection of the dedicated SMF is based on AF request.

7. The chipset of claim 6, wherein the first message is an N11 message or an N15 message.

8. The chipset of claim 6, wherein the AF request information further includes a requested Data Network Access Identifier (DNAI).

9. The chipset of claim 6, wherein a transmission of the second message to the dedicated SMF triggers a change of a User Plane (UP) path.

10. The chipset of claim 9, wherein the change of the UP path comprises:
    performing a deactivation or a release procedure of a Protocol Data Unit (PDU) session; and
    performing a re-activation or a re-establishment procedure of the PDU session.

11. An apparatus for an Access and mobility Management Function (AMF) adapted to operate in a wireless communication system, the apparatus comprising:
    a transceiver;
    at least one processor; and
    at least one memory for storing instructions and operably electrically connectable to the at least one processor,
    wherein the instructions, based on being executed by the at least one processor, perform operations comprising:
    receiving, via the transceiver, a first message including Application Function (AF) request information from an AF,
    wherein the AF request information includes AF request level information, and
    wherein the AF request level information includes information for one or more levels according to a business agreement between an operator and a service provider;
    determining whether to select a dedicated Session Management Function (SMF) based on the AF request information; and based on determining to select the dedicated SMF, transmitting a second message including the AF request information to the dedicated SMF,
wherein the second message informs that selection of the dedicated SMF is based on AF request.

* * * * *